United States Patent [19]

Beam

[11] 4,205,659
[45] Jun. 3, 1980

[54] SOLAR ENERGY COLLECTOR

[75] Inventor: Benjamin H. Beam, Sunnyvale, Calif.

[73] Assignee: Beam Engineering, Inc., Sunnyvale, Calif.

[21] Appl. No.: 822,403

[22] Filed: Aug. 8, 1977

[51] Int. Cl.² ............................................. F24J 3/02
[52] U.S. Cl. .................................. 126/438; 126/425; 250/203 R
[58] Field of Search ............... 126/270, 271, 438, 424, 126/425, 439, 443, 444; 237/1 A; 60/641; 350/293, 299, 289, 295; 248/317; 250/203 R

[56] References Cited

U.S. PATENT DOCUMENTS

| 1,814,897 | 7/1931 | Coxe | 126/270 |
|---|---|---|---|
| 2,791,402 | 5/1957 | Egenwell | 248/317 X |
| 3,847,136 | 11/1974 | Salvail | 126/271 |
| 4,000,734 | 1/1977 | Matlock et al. | 126/271 |
| 4,023,368 | 5/1977 | Kelly | 60/641 |
| 4,031,385 | 6/1977 | Zerlaut et al. | 126/270 |
| 4,038,971 | 8/1977 | Bezborodko | 126/270 |
| 4,068,653 | 1/1978 | Bourdon et al. | 126/271 |
| 4,077,392 | 3/1978 | Garner | 126/271 |
| 4,098,264 | 7/1978 | Brokaw | 126/271 |
| 4,114,594 | 9/1978 | Meyer | 126/271 |
| 4,116,221 | 9/1978 | Zaugg et al. | 126/271 |
| 4,119,365 | 10/1978 | Powell | 126/271 |
| 4,153,039 | 5/1979 | Carroll | 126/438 X |

*Primary Examiner*—James C. Yeung
*Assistant Examiner*—Larry Jones
*Attorney, Agent, or Firm*—Thomas H. Olson

[57] ABSTRACT

A solar energy reflector formed of a rigid frame that supports a thin reflective sheet and retains the sheet in a parabolic or like concave shape notwithstanding severe wind or like loads. The frame includes rigid end plates that define slots that have portions concentric with the focal axis of the parabolic surface so that the reflector can be installed onto and removed from a fixed water carrying pipe without disturbing the plumbing connections to the pipe. A drive system and solar energy sensor circuit connected thereto for assuring that the reflector is aimed at the sun throughout its traverse of the sky from dawn to dusk. A protective cover for the solar collector which both protects the highly reflective surface against deterioration and contributes to the overall strength of the collector.

6 Claims, 10 Drawing Figures

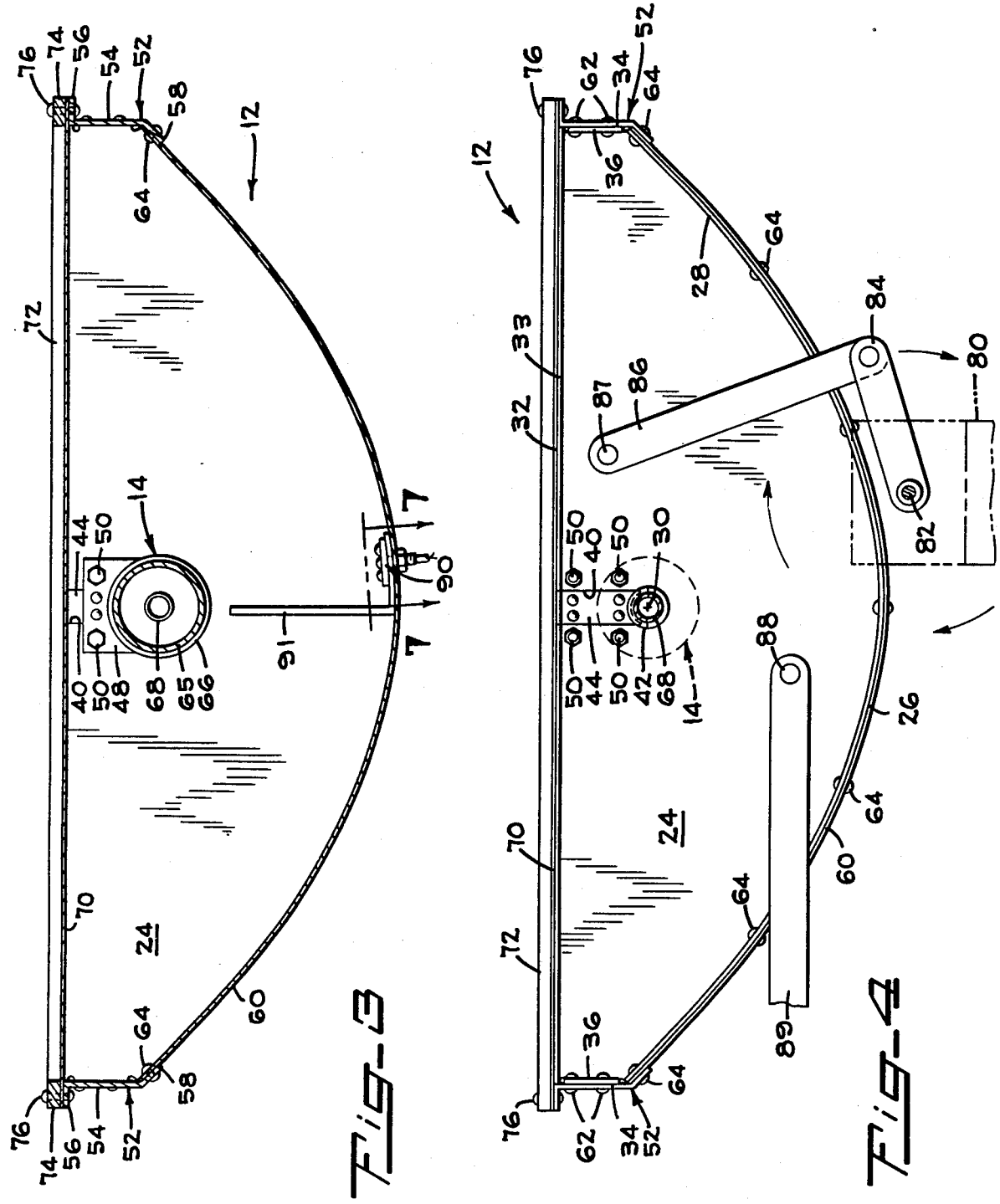

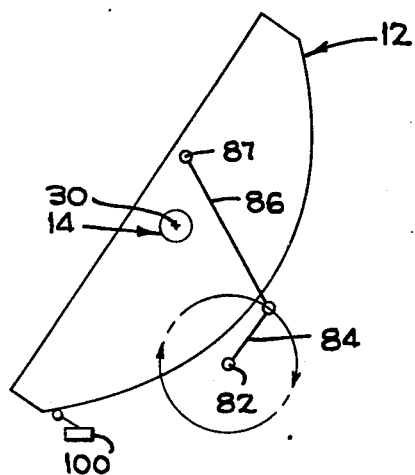
Fig_4A
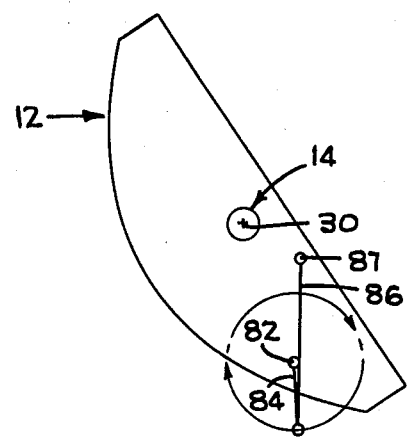
Fig_4B
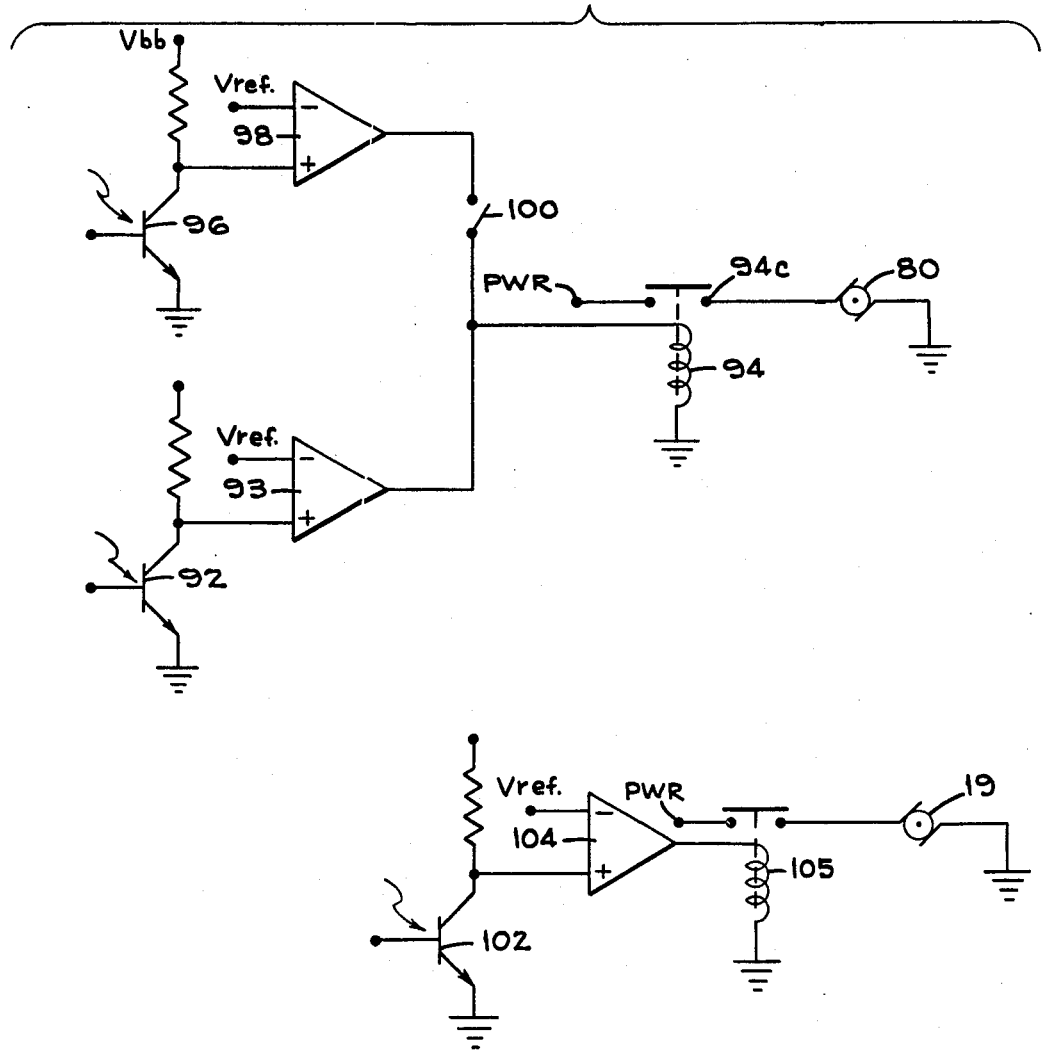
Fig_8

SOLAR ENERGY COLLECTOR

BACKGROUND OF THE INVENTION

1. Field of the Invention

This invention relates to solar collectors and more particularly to a lightweight high strength collector structure and a simple and accurate control system to cause the collector accurately to track the movement of the sun.

2. Description of the Prior Art

U.S. Pat. No. 4,000,734 (126/271) discloses a tracking solar collector. The patented collector lacks the high strength-low weight construction afforded by the invention and employs a drive system that is relatively complex and requires a reversing motor.

U.S. Pat. No. 3,875,926 (126/271) discloses a solar energy collector employing fixed parabolic troughs on the focus of which a heat pipe is supported. Because the patented troughs are fixed, there is only one time during the day that the collected solar energy is focused on the pipe.

U.S. Pat. No. 1,162,505 discloses a solar boiler employing parabolic focusing mirrors which are rotated to track the sun by a motor clock the speed of which is regulated to correspond to the movement of the sun. Such drive system for the mirrors requires constant maintenance to assure accuracy thereof because inaccuracy would substantially lessen the amount of solar energy collected by the device.

In an article appearing in Solar Engineering (October, 1976) entitled "Solar Spec Homes in New Mexico Range in Sizes" there is described a tracking solar collector. The article fails to disclose apparatus for causing the solar collectors to track the sun. It also apparently fails to disclose the lightweight construction employed in the invention in that the disclosed reflectors are mounted at ground level rather than on the roof of the building that they serve.

SUMMARY OF THE INVENTION

According to the present invention there is a rigid frame formed of two end plates that are supported in parallel space relation by two side pieces. The end plates and the side pieces have right angle integral flanges to provide resistance to bending in all directions. The end plates define aligned parabolically shaped edges which are flanged so that a thin sheet of polished aluminum or like reflective material can be secured thereon. The material is not permanently deformed but is maintained in the parabolic shape by the framework.

Accordingly, it is an object of the invention to provide a solar collector that combines high strength and light weight. High strength is important when it is realized a solar collector embodying the present invention is typically mounted on the roof of a building, a location at which the collector is subjected to substantial wind loading. The light weight of the present collector is important because it permits installation on existing buildings without the necessity for structural redesign or reinforcement.

Another object is to provide a solar collector which can be installed and maintained in an economical manner. This object is accomplished by the present invention by forming slots in the above mentioned end plate that permit the collector to be installed onto and removed from the water carrying pipes without in any way disturbing the plumbing connections to the pipes. The end plate is formed so that the portion thereof that defines the slot resides at the focus of the parabolic surface. A split bushing and a bushing retainer carried within the slot permit the collector to be installed onto and removed from the piping without disconnecting or otherwise affecting the piping in any way.

A further object of this invention is to provide an accurate and economical drive system for assuring that one or more of the collectors track the sun throughout the day to maximize the reflected energy that impinges on the piping. This object is achieved, in part, by a unique system for linking a drive motor to the collector so that a non-reversing or uni-directional motor can be employed. As is known, such motors are economical and are substantially trouble free over a long period of time.

Still another object is to provide a control system for the motor which is accurate and which accommodates all environmental conditions. The control system includes a photoelectric sensor that is installed at or near the vertex of the parabola. When the collector is positioned such that the sensor, the water pipe and the sun are aligned with one another, the sensor is shaded by the water pipe. When, however, the sun moves sufficiently to excite the sensor, the output of the sensor is employed to activate the drive motor until the sensor is again shaded by the pipe. An opaque shield is provided to ensure that only solar energy that leads the orientation of the collector will influence the photoelectric sensor. A second sensor of different sensitivity detects nightfall and initiates return of the collector to the morning position. A third sensor controls a water pump so that water is supplied to the pipe only when solar rays impinge thereon.

Yet another object is to provide a cover for the collector which performs the functions of protecting the reflective parabolic surface from deterioration, maintaining high temperature on the water pipe even in the presence of substantial wind, and contributes to the overall strength and rigidity of the reflector. The cover includes a rigid frame which is fixed to the flanges of the end plates and side pieces, the frame supporting a sheet of transparent plastic in overlying relation to the cavity formed by the collector structure.

The foregoing, together with other objects, features and advantages of the invention, will be more apparent after referring to the following specification and the accompanying drawings.

BRIEF DESCRIPTION OF THE DRAWINGS

FIG. 3 is a cross sectional view of the solar collector at enlarged scale and taken along line 3—3 of FIG. 2.

FIG. 4 is an end view of the solar collector showing the drive mechanism therefor and showing the position of the collector at about noon.

FIG. 4A is a schematic view at reduced scale similar to FIG. 4 and showing the collector near the sunrise position.

FIG. 4B is similar to FIG. 4A showing the collector near the sunset position.

FIG. 5 is a fragmentary view at enlarged scale of the structure for mounting the collector for rotation on the pipe.

DESCRIPTION OF THE PREFERRED EMBODIMENT

Figure 1:
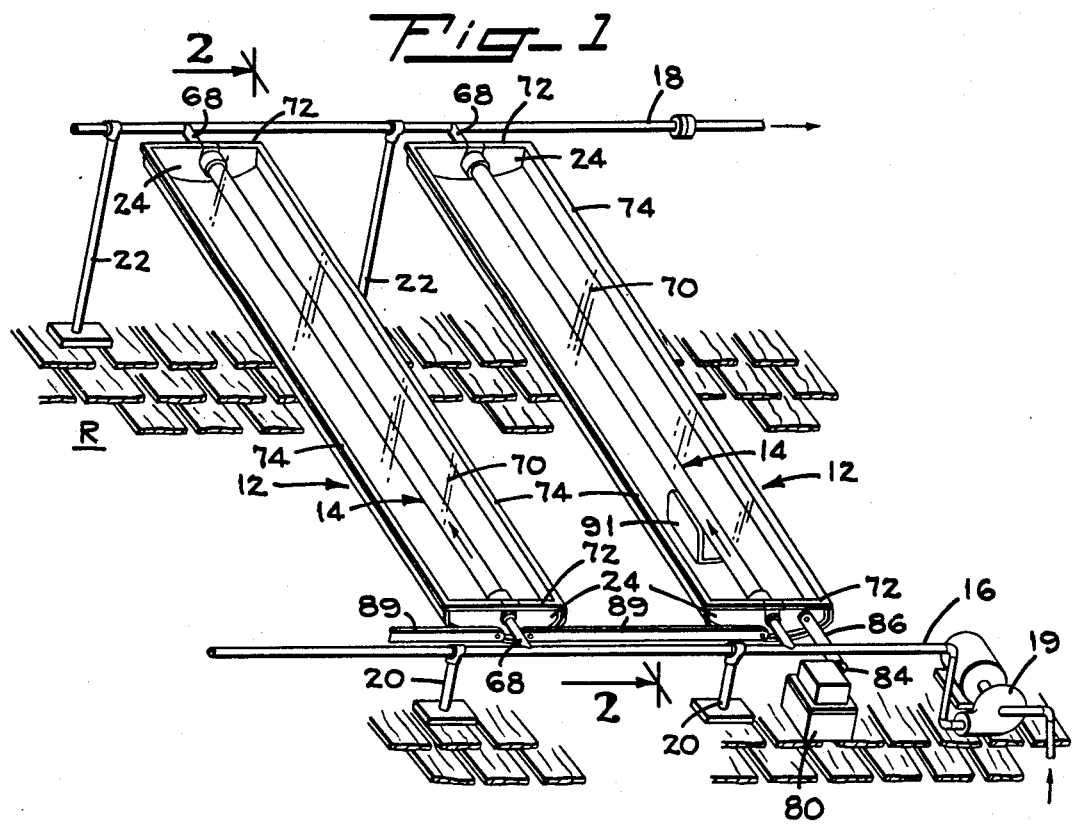
FIG. 1 is a perspective view of a solar collector constructed according to the present invention in place on a building roof.

Referring more particularly to the drawings, reference numeral 12 identifies a solar collector according to the invention, two of which are shown in FIG. 1 installed on the roof R of a residence or like building. Solar collectors 12 are rotatably supported on fixed individual pipe sections 14 which pipe sections extend from a cold water inlet manifold pipe 16 to a hot water outlet manifold pipe 18. A motor driven pump 19 is provided for delivering water to inlet manifold pipe 16. The manifold pipes are supported so that pipe sections 14 reside in a north-south orientation above the surface of roof R by lower pedestal members 20 and upper pedestal members 22. The length of the pedestal members is established in respect to the slope of roof R so that the axis of pipe section 14 lies at a suitable angle, the specific angle depending on the latitude of the site at which the apparatus is installed. A suitable angle with respect to horizontal at Los Altos Hills, Calif., which is 37° north latitude, is 42°. An angle of 42° favors the winter sun.

Each collector 12 includes identical end plates 24 which are formed of rigid material having substantial strength such as aluminum sheet having a thickness of 0.090 inch. Each end plate 24 has a convexly curved edge portion 26, there being a flange 28 bent up from the edge portion 26 at a 90° angle to the plane of the end plate. Because convexly curved edge portion 26 is optimally of parabolic shape, it is so characterized in the ensuing description without any intention of limiting the structure to such specific configuration. The configuration of convexly curved edge 26 is such that the focus of rays reflected by a similarly shaped surface is at or near a point 30 which is within the periphery of the end plate. The end plate terminates at an upper linear edge 32 from which a flange 33 extends at 90°. In flanking relation of convex shaped edge 26 on opposite sides of point 30 are linear side edge portions 34 which also have perpendicular flanges 36. Because of the strength of the material of which end plates 24 are constructed and because of the right angle flanges throughout the periphery of the end plates, the end plates have substantial strength and rigidity.

Concentric with focus point 30, end plate 24 defines an opening 38 which communicates to edge 32 of the end plate by means of a slot 40. The diameter of opening 38 as well as the width of slot 40 corresponds to the external diameter of a split bushing 42. A bushing retainer 44 has a width corresponding to the width of slot 40 and a lower arcuate portion 46 which has a radius of curvature equivalent to the external shape of split bushing 42. Bushing retainer 44 is riveted to a mounting plate 48, the mounting plate being bolted to end plate 24 by bolts 50.

For supporting two or more end plates 24 in rigid parallel spaced apart relationship, there is a pair of identical side pieces 52. Each side piece includes a planar portion 54 that has a dimension approximating that of linear side edge portion 34 of end plate 24. Each side piece 52 also has a right angle flange 56 and an obtusely extending lip 58 which forms a mounting flange for the longitudinal edges of a thin reflective sheet 60. The end margins of side pieces 52 are riveted to the respective flanges 36 by means of rivets 62 so that a rigid rectangular frame is formed. Because of the presence of perpendicular flange 56, the side pieces 52 have substantial rigidity even in the presence of wind forces and the like.

Secured to the parabola shaped or convexly curved edge 26 of end plates 24 and to lips 58 of side pieces 52 is a lightweight solar reflective sheet 60, rivets 64 serving to retain sheet 60 in place. In one collector designed according to the invention sheet 60 is formed from a flat aluminum sheet about two feet wide and about eight feet long and has a special reflective plated surface, such product being sold under the trade name Coilzak. The thickness of the Coilzak material is about 0.025 inch. Because of the modest thickness of the material, it is easily deformable into a concave shape similar to that of convex edge 26 and is maintained in such shape because it is riveted to both end plates and to lips 58 of side pieces 52.

Figure 6:
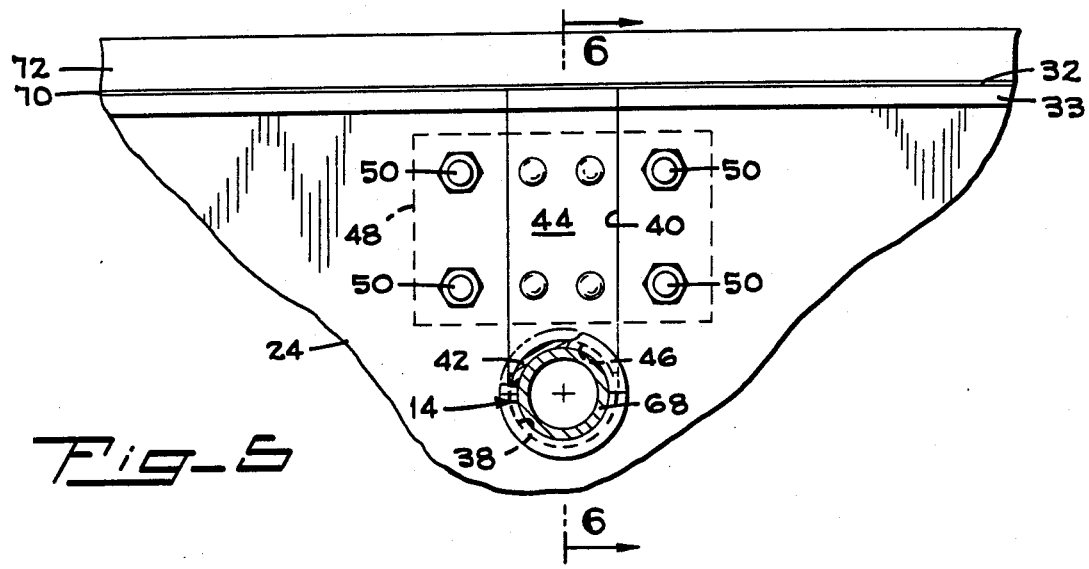
FIG. 6 is a cross sectional view taken along line 6—6 of FIG. 5.

As seen most clearly in FIG. 6, pipe section 14 includes a relatively large diameter segment 65 which has a length somewhat less than the space between opposite end plates 24. Each end of pipe segment 65 is threaded to engage a reducing coupling 66, the outer end of the reducing coupling being threadedly engaged with a relatively small diameter nipple 68. The outer diameter of nipple 68 fits snugly within split bushing 42 so as to support the end plates and the entire collector 12 for rotation on the axis of the pipe section. Nipple 68 is rigidly connected to manifolds 16 and 18 by conventional T fittings (not shown). Accordingly, the piping, which has an extremely long life, is installed permanently and need not be disturbed should it become necessary for some reason to remove one or more of the collectors.

For excluding rain and the like from the interior of collector 12 there is a transparent, solar energy pervious cover sheet 70 which is supported in a rectangular frame composed of end frame members 72 and side frame members 74. The frame members are fastened by removable fasteners 76 to flanges 56 of side pieces 52 and flanges 33 of end plates 24. In one structure designed according to the invention frame members 72 and 74 are aluminum sections widely employed for supporting window screens, and sheet 70 is Tedlar, having a thickness of about 0.004 inch. The sheet material, although not a perfect transmitter of solar radiation, excludes wind and contaminating materials from the interior of the surface of sheet 60 as well as contributing to the strength of the collector. Moreover, it prevents loss of heat by radiation because the material is substantially impervious to infrared; i.e., the presence of sheet 60 produces a greenhouse effect. Finally, sheet 60 acts as a diaphragm which resists diagonal loads on collector 12 to enhance the torsional rigidity thereof.

For positioning collector 12 so that it is aimed at the sun throughout the day, there is a motor 80 which is supported on a base secured to roof R. Motor 80 is a relatively simple motor capable of direction in only one sense, a clockwise sense, as viewed in FIG. 4. The motor has a shaft 82 which is oriented in parallelism to the rotational axis of the collector, i.e., parallel to pipe section 14. Rigid with the motor shaft is a crank arm 84 having a free end to which is pivotally attached an operating lever 86. The end of operating lever 86 remote from crank arm 84 is pinned at 87 to end plate 24. The position of motor shaft 82 with respect to pin 87 as well as the relative dimensions of crank arm 84 and operating lever 86 causes collector 12 to be rocked throughout an arc of approximately 120° in response to one full rotation of crank arm 84. Also pinned to the same end plate at 88 is a connecting rod 89 which has its opposite end pinned to the end plate of the adjacent collector so that two or more collectors can be aimed in unison from one motor and control system.

In FIG. 4 collector 12, crank arm 84 and operating lever 86 are positioned to receive solar energy from the sun when it is directly overhead, a condition typically occurring around noon. As the sun moves toward the right as viewed in FIG. 4, motor shaft 82 is intermittently rotated in a clockwise position so that collector 12 is at all times aimed directly at the sun. At the end of the day, the collector assumes a position shown in FIG. 4B at which time the control circuitry to be described rotates motor shaft 84 and crank arm 86 through an arc of about 240° to the position shown in FIG. 4A. Collector 12 resides in the position shown in the latter figure until the sun rises in the morning and activates the control circuitry. Once the sun rises, collector 12 is moved about axis 30 to track the sun throughout the day and is restored back to the morning position at the end of the day.

Figure 2:
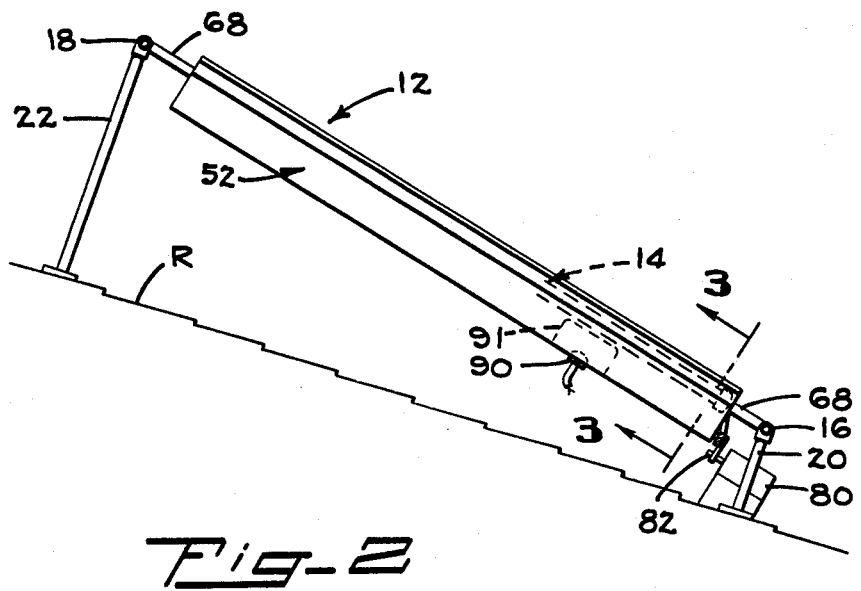
FIG. 2 is a side view of the collector of FIG. 1 taken along line 2—2 of FIG. 1.
Figure 8:
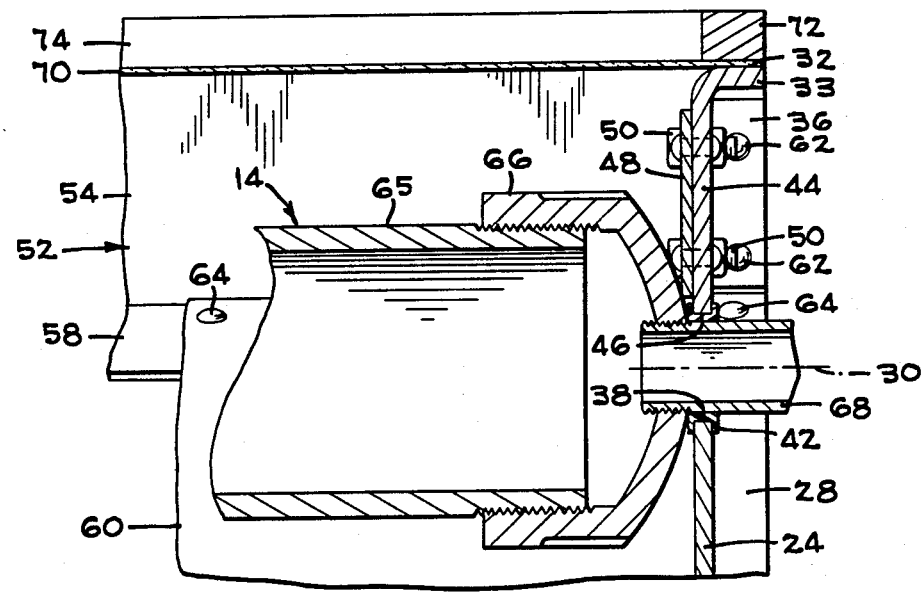
FIG. 8 is a schematic diagram of the sensing and control circuitry of the invention.
Figure 7:
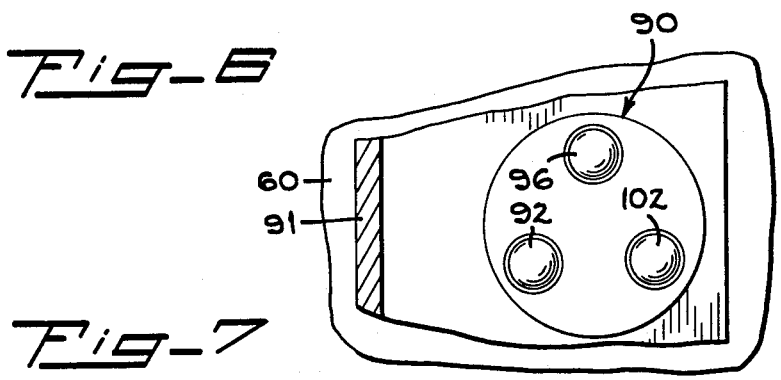
FIG. 7 is a top view of the photoelectric sensors employed in the invention, the figure being taken along line 7—7 of FIG. 3.

The control circuitry for aiming collector 12 as briefly mentioned hereinabove is activated by a combination of three photosensors in an array 90, which photosensors are mounted on sheet 60 in approximate alignment with the axis of the parabolic shape. An opaque shield 91 is fixed to sheet 60 adjacent array 90 so that the photocells are influenced only by solar radiation emanating from a westward direction (a rightward direction as viewed in FIG. 4). The provision of shield 91 contributes to the simplicity of the control system of the invention. As seen in FIG. 2, shield 91 has a sufficient axial extent that it shields array 90 from eastward sun throughout the year. One of the photosensors identified at 92 is a tracking photosensor in that it operates throughout a sunny day to cause intermittent activation of motor 80 so that collector 12 tracks the sun. Photosensor 92, exemplified as a photo transistor in FIG. 8, produces a signal when illuminated which is amplified by an amplifier 93 so as to energize motor relay coil 94. The coil closes normally open contacts 94c to supply power to motor 80. When the collector has advanced so that photosensor 92 is shaded by pipe section 14, the relay coil is de-energized and the contacts are open, thus interrupting power to motor 80.

Should clouds between the sun and the sensor obscure photosensor 92 the control system will resume tracking when the sun impinges on the photosensor because of the relatively shallow construction of the collector 12. More specifically, and as can be seen in FIG. 4A, photosensor 92 will be activated to track the sun even if the first sun does not occur until after noon.

Photosensor array 90 also includes a sensor 96 which is connected through an operational amplifier 98 and microswitch contacts 100 to the coil of motor relay 94. Operational amplifier 98 produces an output signal only when the solar radiation incident on photosensor 96 reaches a low value or is non-existent as at twilight or nighttime. Therefore, at twilight operational amplifier 98 produces a signal which, through motor relay 94, energizes motor 80 to rotate collector 12 from the position shown in FIG. 4B to the position shown in FIG. 4A. At the latter position, microswitch contacts 100 are opened because the microswitch is supported with its actuator in the path of the collector and power to the motor relay coil is interrupted. The collector resides in the position of FIG. 4A throughout the nighttime and begins to track the sun in the morning when photosensor 92 is excited by the morning sun when the sun reaches a position at which its rays pass the westward side of pipe section 14 and illuminate the photosensor.

A final control provided in the system arises from a photosensor 102 which, through an amplifier 104 and a relay 105, activates pump 19 thereby supplying water to inlet manifold pipe 16. Thus, water is circulated through the system only when solar energy impinges on collector 12 and is inactive at all other times.

The operation of the invention will be described by starting before dawn, at which time collector 12 resides in the position shown in FIG. 4A. When the sun begins to rise, its rays impinge on the interior concave surface of sheet 60 and the rays are concentrated on the surface of pipe segment 64. In consequence the water within the pipe is heated. As the sun continues its east to west movement, photosensor 102 is excited to cause pump 19 to circulate water through the system. When the sun reaches a position at which it is past the axis of the concave reflective surface of sheet 60, photosensor 92 will be illuminated by the sun. At that time motor 80 is activated to rotate the collector until photosensor 92 is again shaded by pipe section 14. This action continues throughout the day and motor 80 is intermittently operated to maintain the collector at the optimal angle with respect to the incoming solar rays. In one system designed according to the invention, motor 80 is activated for several seconds every three minutes. Should a cloud obscure the sun, photosensor 92 will not be excited. When the cloud finally moves away, however, photosensor 92 will be energized and in turn will energize motor 80 until the collector 12 is again aimed at the sun. At twilight or dusk, photosensor 96 senses the absence of solar energy and through operational amplifier 98 activates motor 80 to return the collector to the morning position shown in FIG. 4A, at which position the contacts of microswitch 100 are opened. Because of the drive linkage constituted by motor arm 84 and operating arm 86, motor 80 is a unidirectional motor and the relatively simple control circuitry described hereinabove suffices to afford proper positioning of the collectors throughout all operation conditions.

In installing a system embodying the present invention the water piping including water inlet manifold 16, water outlet manifold 18, and pipe sections 14 are installed. The installation proceeds expeditiously because collectors 12 are not fastened to the pipe sections during such installation. After the piping has been installed and tested, the collectors and other accessories can be added without in any way disturbing the piping connection. More particularly, a part of split bushing 42 is installed, the collector is engaged on the pipe by moving slot 44 over the pipe, the remainder of the split bushing is installed, and then bushing retainer 44 is fixed in place by bolts 50. Finally, cover sheet 70 is installed. Should subsequent repair or maintenance be required, the steps described above are performed in reverse order, and the collector can be removed without in any way affecting the piping connections. Accordingly, maintenance can be achieved quickly and without disrupting the activities of the occupants of the building on which the device is installed.

One collector designed according to the present invention has a width of approximately twenty-two inches and a length of approximately eight feet. Such collector has a weight of approximately twenty-five pounds which makes it easy to install or remove. Moreover, the exemplary collector has sufficient strength to resist wind loading and the like in excess of 20 pounds per square foot, a rating that complies with all known building codes. Additionally, because the structure is predominantly aluminum, it has a long useful life even in the presence of contaminating atmospheres.

Collectors dimensioned according to the above example can be mounted on four-foot centers and can pivot throughout the full 120° arc without interfering with one another. Although collectors up to a length of about eight feet have adequate rigidity as depicted in the drawings, collectors of greater length can be fabricated according to the invention by installing one or more end plates 24 between those end plates at the extremities of the collector.

Thus it will be seen that the present invention provides a solar collector which is simple to install and maintain, which accurately tracks the sun movement with minimal control elements and which can be readily installed and removed for maintenance without affecting the piping system that is a part of the collector. Although one embodiment of the invention has been shown and described, it will be obvious that other adaptations and modifications can be made without departing from the true spirit and scope of the invention.

What is claimed is:

1. A solar collector comprising first and second substantially identical rigid end plates which respectively define congruent convex edges and define in a portion remote from said edges a slot that has an arcuate portion concentric with the focus of the convex edge, said slots each having a linear portion extending from said arcuate portion to an edge of respective said end plates remote from said convex edges, first and second rigid elongate side pieces joined to respective said side edge portions and extending between said end plates to form a generally rectangular frame, a sheet of reflective material secured to said convex edges and said side pieces so as to form a concave surface intermediate said end plate and said side pieces, a rigid pipe extending through the slots in respective said end plates, support means exterior of said rectangular frame for immovably mounting said pipe, bushing means for rotatively supporting said end plates relative said rigid pipe so that said pipe coincides with the focus of the concave surface, a bushing retainer substantially coextensive with said linear slot portion and having a radiused portion cooperable with said arcuate portion to define a circular opening concentric with the focus of the concave sheet surface, said bushing means including a split bushing having an inner diameter corresponding to the outer diameter of said rigid pipe and an outer diameter corresponding to said circular opening, means for removably mounting said bushing retainer in said slot to afford installation and removal of said rectangular frame onto and from said rigid pipe without affecting the pipe, and means for pivoting said frame relative said pipe so that said concave surface tracks the sun throughout its traverse.

2. In a solar energy collector of the class including a reflective trough having a reflective surface of concave cross-sectional shape, a heat absorbing element supported at the focus of the reflective surface, said heat absorbing element being elongated along an axis and lying so that said axis is directed along a substantially north-south line, and means for rotatively driving the reflective surface only toward a westward pointing direction so to expose the reflective surface and the element to solar rays, the improvement comprising a photoelectric sensor mounted on said reflective surface proximate the vertex thereof, an opaque shield secured to said reflective surface laterally adjacent said sensor and extending substantially parallel to the axis of said reflective surface on the eastward side thereof, and means connecting said sensor to said driving means to activate said driving means when said sensor is not shaded by said shield or said heat absorbing element.

3. A solar collector comprising first and second substantially identical rigid end plates which respectively define congruent convex edges and define in a portion remote from said edges a slot that has an arcuate portion concentric with the focus of the convex edge, each said end plate having a pair of linear mutually parallel side edge portions flanking said convex edge, first and second rigid elongate side pieces having a width substantially equal to the length of said side edge portions and being joined to respective said side edge portions and extending between said end plates to form a generally rectangular frame, each said side piece having a flange perpendicular to said side edge portions and integral therewith for affording rigidity thereto, said flanges residing in a flat plane spaced from said convex edges by a distance greater than the spacing of said slot portion therefrom, a sheet of reflective material secured to said convex edges and said side pieces so as to form a concave surface intermediate said end plates and said side pieces, a rigid pipe extending through the slots in respective said end plates, bushing means for rotatively supporting said end plates relative said rigid pipe so that said pipe coincides with the focus of the concave surface, means for pivoting said frame relative said pipe including a unidirectional motor having a shaft and being mounted in spaced relation to said pipe and said collector, a crank arm secured to said shaft for rotation therewith, said crank arm having a distal end remote from said shaft, and an operating lever having a first end pinned to said distal end and a second end pinned directly to said end plate at a site remote from said bushing means, said operating lever being longer than said crank arm and being proportioned so that said collector pivots through an angle of approximately 120° in response to full rotation of said motor shaft, and motor control means including a photosensor secured to said concave surface in proximity to the vertex of said surface so that said photosensor resides in the shadow of said rigid pipe when said concave surface is directed at the sun and means operatively connecting said photosensor to said motor for activating said motor in response to impingement of solar energy on said photosensor so that said rectangular frame is pivoted until the rigid pipe again shades the photosensor.

4. A solar collector according to claim 3 in combination with an opaque shield supported adjacent said photosensor and extending toward said pipe, said opaque shield being disposed laterally of said photosensor to shade said photosensor from rays passing the eastward side of said pipe so that said photosensor is excited only by solar rays passing the westward side of said pipe.

5. A solar collector comprising first and second substantially identical rigid end plates which respectively define congruent convex edges and define in a portion remote from said edges a slot that has an arcuate portion concentric with the focus of the convex edge, first and second rigid elongate side pieces joined to respective said side edge portions and extending between said end plates to form a generally rectangular frame, a sheet of reflective material secured to said convex edges and said side pieces so as to form a concave surface intermediate said end plate and said side pieces, a rigid pipe extending through the slots in respective said end plates, means for rotatively supporting said end plates relative said rigid pipe so that said pipe coincides with the focus of the concave surface, and means for pivoting said frame relative said pipe so that said concave surface tracks the sun throughout its traverse, said pivoting means including a unidirectional motor having a shaft and being mounted in spaced relation to said pipe and said collector so that said shaft is parallel to said pipe, a crank arm secured to said shaft for rotation therewith, said crank arm having a distal end remote from said shaft, and an operating lever having a first end pinned to said distal end and a second end pinned directly to said end plate at a site remote from said support means, said operating lever being longer than said crank arm so that in response to rotation of said shaft, said collector pivots through an angle less than 360°, said operating lever being mounted on the side of said crank arm opposite said motor shaft to permit said motor shaft to rotate 360° in a single direction, and motor activating means responsive to misalignment between the sun and said concave surface for activating the motor in the single direction to move the concave surface into alignment with the sun.

6. A solar energy collector according to claim 5 wherein said motor activating means includes a photoelectric sensor mounted for movement with said concave surface and an opaque member mounted for cooperation with said sensor to effect lesser excitation of said sensor when said collector is in a position aligned with the sun than when the sun is westward of said position.

* * * * *